United States Patent
Robinson et al.

(10) Patent No.: US 6,315,723 B1
(45) Date of Patent: Nov. 13, 2001

(54) ULTRASONIC DIAGNOSTIC IMAGING SYSTEM WITH SYNTHESIZED TRANSMIT FOCUS

(75) Inventors: Brent Stephen Robinson, Kirkland; Thomas J Sabourin, Mill Creek; Clifford R. Cooley, Seattle, all of WA (US)

(73) Assignee: ATL Ultrasound, Bothell, WA (US)

( * ) Notice: Subject to any disclaimer, the term of this patent is extended or adjusted under 35 U.S.C. 154(b) by 0 days.

(21) Appl. No.: 09/415,959

(22) Filed: Oct. 8, 1999

(51) Int. Cl.$^7$ ..................................................... A61B 8/00
(52) U.S. Cl. .................... 600/443; 680/447; 600/448; 600/449; 600/455; 600/458; 600/443
(58) Field of Search .................. 680/447; 600/448, 600/449, 455, 458, 443

(56) References Cited

U.S. PATENT DOCUMENTS

| | | |
|---|---|---|
| 4,305,296 | 12/1981 | Green et al. . |
| 5,113,706 | 5/1992 | Pittaro . |
| 5,142,649 | 8/1992 | O'Donnell . |
| 5,235,982 | 8/1993 | O'Donnell . |
| 5,390,674 | 2/1995 | Robinson et al. . |
| 5,568,813 | 10/1996 | Wright et al. . |
| 5,579,770 | 12/1996 | Finger . |
| 5,891,038 | 4/1999 | Seyed-Bolorforosh et al. . |
| 5,961,463 | * 10/1999 | Rhyne et al. .................. 600/458 |
| 5,980,459 | * 11/1999 | Chiao et al. .................... 600/447 |
| 6,048,315 | * 4/2000 | Chiao et al. .................... 600/447 |
| 6,056,693 | 5/2000 | Haider . |

FOREIGN PATENT DOCUMENTS

WO 99/30617   6/1999   (WO) .

OTHER PUBLICATIONS

U.S. application No. 08/993395, Napolitano et al., filed Dec. 18, 1997.
U.S. application No. 08/993,533, Cole et al., filed Dec. 18, 1997.

* cited by examiner

Primary Examiner—Marvin M. Lateef
Assistant Examiner—Maulin Patel
(74) Attorney, Agent, or Firm—W. Brinton Yorks, Jr.

(57) ABSTRACT

An ultrasonic diagnostic imaging system is provided with synthesized transmit focus. Several beams are transmitted, each with a different transmit focus. Echoes received from the differently focused beams are combined to form a scanline with an extended focus. The echoes are preferably weighted and/or phase adjusted prior to being combined. Combining is performed in the r.f. domain before nonlinear processing of the signals such as amplitude detection. The resultant extended focus scanline exhibits the property of dynamic transmit focusing.

32 Claims, 6 Drawing Sheets

ULTRASONIC DIAGNOSTIC IMAGING SYSTEM WITH SYNTHESIZED TRANSMIT FOCUS

This invention relates to ultrasonic diagnostic imaging systems and, in particular, to ultrasonic diagnostic imaging systems which synthesize transmit focal zones.

Conventional ultrasonic diagnostic imaging systems utilize dynamic focus during beam formation to dynamically vary the focal range of received ultrasonic echoes as the echoes are received. This capability is made possible by the ability to continually change the delays applied to echoes received from different elements of a transducer array as the echoes are received, thereby continually changing the focal range of the transducer array's receive aperture. The effective curvature of the receive aperture is constantly made more gradual to progressively focus the transducer array at increasing ranges as echoes are received from ever-increasing depths following a transmit wave.

Such a dynamic focus capability is not possible during transmit, however. A transmitted beam can be focused at only one range by selectively delaying the application of transmit pulses across the aperture, with elements at the center of the array transducer experiencing delayed excitation in relation to elements located toward the lateral extremes of the transmit aperture. Once the transmit wave has been launched, it is not possible for the ultrasound system to modify or adjust its focus. Various techniques have been tried to effect a focal region at different or more extended depths such as focusing different elements of the array at different depths, combining multiple transmit pulses in a single transmission, encoding different frequency components to focus at different depths, and lateral deconvolution. All of these techniques have met with mixed success, complexity and/or compromise.

A conventional technique for dealing with the single focal characteristic of the transmit beam is what is known as multi-zone focus. In multi-zone focus each beam location is interrogated multiple times, with each transmission focused at a different transmit depth. During reception echoes are received around the focal range of each unique transmit beam, thereby acquiring segments of a complete receive scanline from different depth ranges. The segments are then spliced together to form a complete scanline is for an image. A problem which always presents itself in multi-zone focusing is how to smoothly fit one segment into another. One solution has been to "butt-fit" segments together by truncating the beginning and ending of adjoining segments at a predetermined depth, as shown in U.S. Pat. No. 4,505,296. Another solution has been to overlap the ends of adjoining segments and cross-fade from one segment to another as described in U.S. Pat. Nos. 5,568,813 and 5,579,770. These solutions all require an extensive degree of care to prevent visible seams in the image where the segments from different depths are joined or blended together. It would be desirable to be able to improve the transmit focal characteristics of an ultrasound system so that the system can focus a transmit beam over a greater range of depths without seam artifacts during multi-zone operation, and desirably without the need for a large number of focal zones which reduces the frame rate of display.

In accordance with the principles of the present invention, received ultrasound signals with differing transmit focal characteristics are processed to synthesize the characteristics of an extended transmit focal zone. In a preferred embodiment the processing is done on coherent echo signals by varying the signal delay, weighting, or both, then combining the signals to form a scanline with extended focal characteristics. In a preferred embodiment echoes received from differently focused transmit waves are filtered by a filter which delays and/or weights the echoes and then combines them to synthesize an extended transmit focal characteristic.

Figure 10:
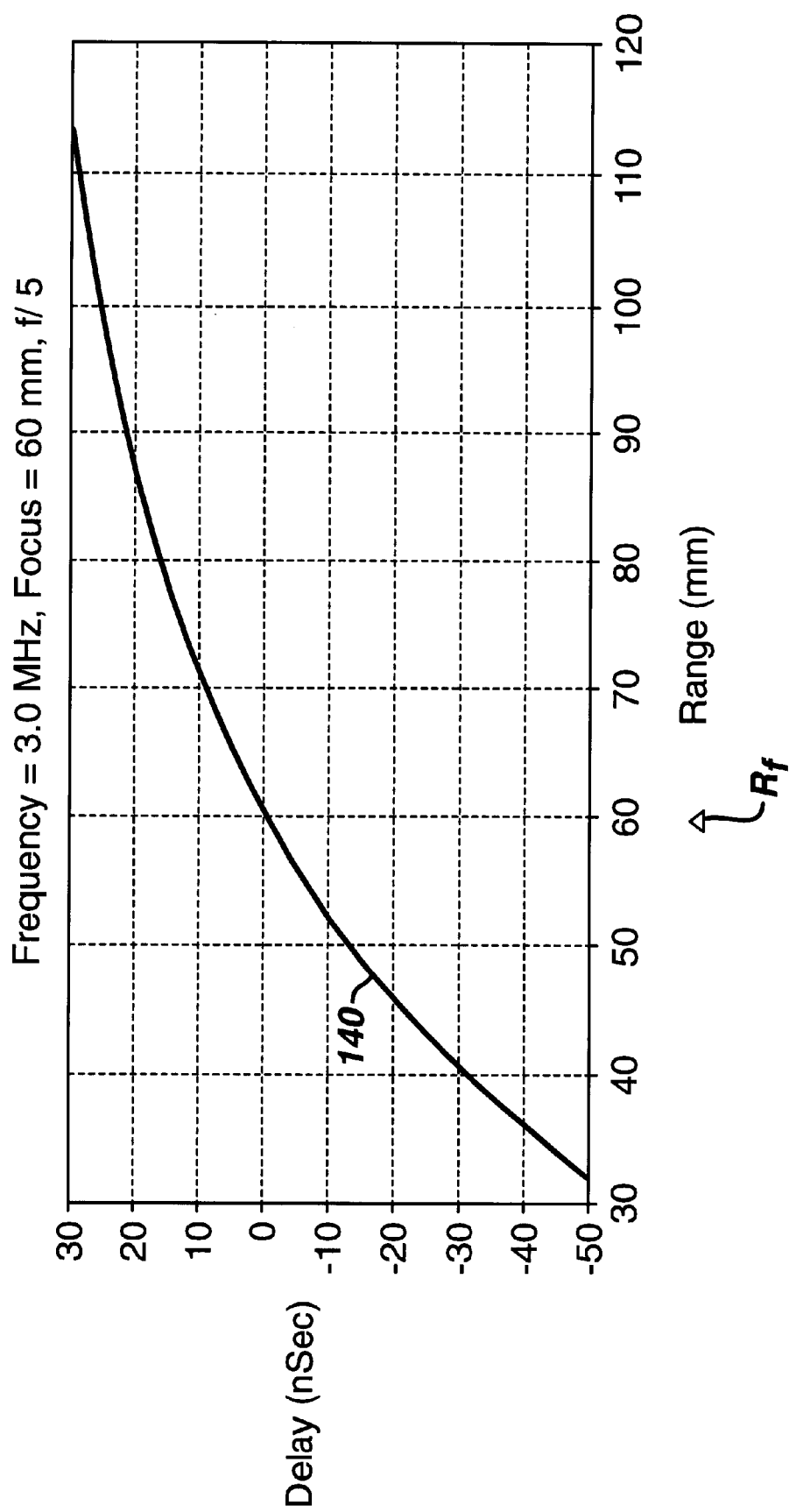
Figure 11:
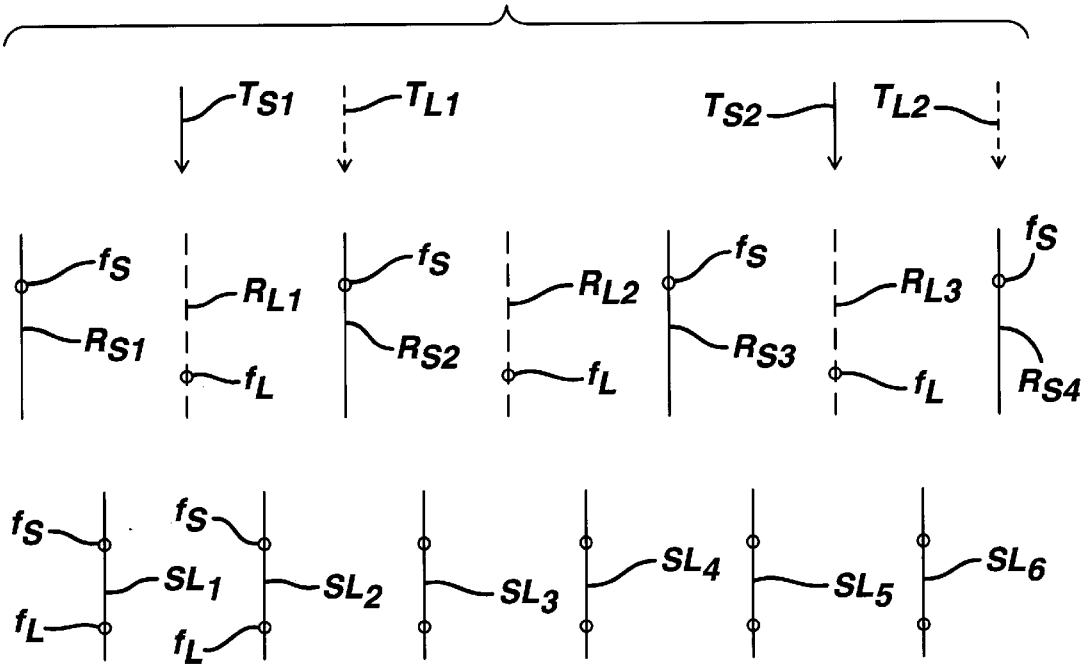

FIGS. 8a, 8b, 9a, and 9b illustrate delay adjustments used to combine two differently focused beams in accordance with the principles of the present invention;

FIG. 10 illustrates a plot of delay variation along a scanline in accordance with the principles of the present invention; and FIG. 11 illustrates an embodiment of the present invention in which laterally spaced scanlines are interpolated to produce image scanlines with extended focal ranges.

Our U.S. Pat. No. 5,390,674 teaches that ultrasound lines located at positions intermediate to acquired lines can be synthesized by laterally interpolating signals from the acquired line positions. This technique is valid when the acquired line positions are close enough together to satisfy the Nyquist sampling criteria, appropriate interpolation weights are used, and the signals are combined coherently. Under these conditions the synthesized data closely approximate the echo data that would be acquired if the beamformer steering delays were adjusted to form actual lines at the intermediate positions. It follows that amplitude interpolation of the echo data can, within the constraints mentioned above, give substantially the same results as actually altering beamformer steering delays.

The present invention extends this principle to transmit focal delays. More specifically ultrasound data at an intermediate transmit focal depth is synthesized by coherently combining signals acquired using transmit foci at adjacent depths. Just as in the lateral case, this technique is most effective when the adjacent foci are in close enough proximity to satisfy the sampling criteria and the data are appropriately weighted prior to combination. In the case of the present invention, amplitude interpolation is used to synthesize the effect of altering focal delays rather than steering delays.

More specifically, the signal returned from each transmit focus is regarded as a sample in an interpolation process. For uniform sampling the locations of the acquired and synthesized samples are not uniform in focal depth per se. Rather, they are uniform in a parameter related to the focal depth by a monotonic function. For example, in the region where the paraxial approximation holds, the function exhibits an inverse relation with focal depths.

In a constructed embodiment of the present invention, uniform sampling has several advantages. Firstly, the required number of samples is minimized. Secondly, the interpolation weights can be chosen by a simple algorithm, namely sub-sampling of the prototype filter. In the context of this invention, uniform sampling is preferably achieved by positioning the transmit foci so that the samples are spaced by equal steps of focal delay. The transmit foci are close enough together to support interpolation without aliasing when the maximum focal delays in the transmit aperture change by less than $1/F_s$ from one transmit focus to the next transmit focus (where $F_s$ is the minimum frequency capable of sampling the ultrasound signal adequately in time).

Figure 1:
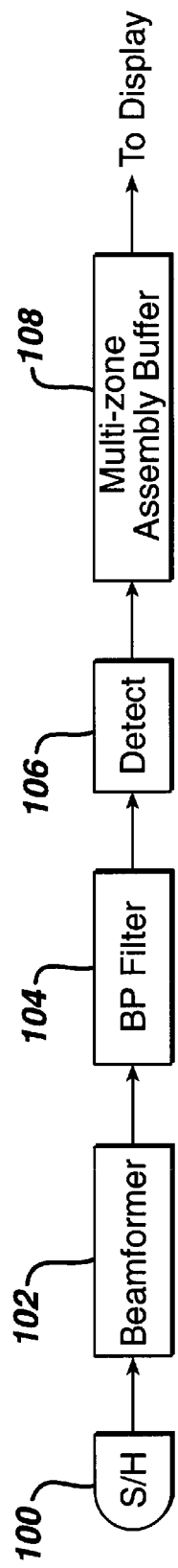
FIG. 1 illustrates in block diagram form an ultrasound system of the prior art which performs multi-zone focusing.

Referring first to FIG. 1, a typical prior art multi-zone ultrasound system is depicted in block diagram form. A scanhead 100 transmits and receives two or more beams in a given beam direction, each with a different transmit focus. The received echo signals are coherently combined by a beamformer 102 to form receive beam signals which are filtered by a bandpass filer 104, detected by a detector 106, and stored in a multi-zone assembly buffer 108. The assembly buffer separates out a segment of each received beam around its unique focal point and splices the segments together to form a scanline for the given beam direction. The resultant multi-zone focused scanline therefore exhibits optimal focal characteristics at the locations of the multiple focal points of the spliced beam segments as illustrated in FIG. 4.

Figure 2:
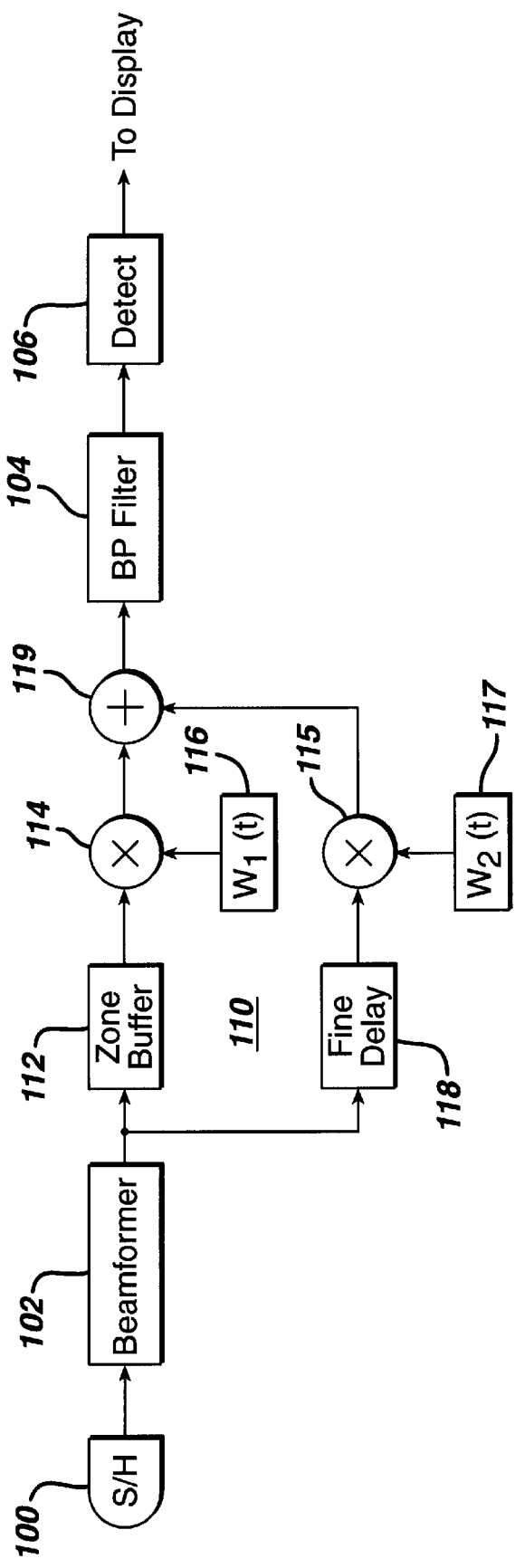
FIG. 2 illustrates in block diagram form a first embodiment of an ultrasound system constructed in accordance with the principles of the present invention.

Referring now to FIG. 2, an ultrasound system comprising a first embodiment of the present invention is shown in block diagram form. Two or more beams are once again transmitted with different focal characteristics and the received echoes coherently formed by the beamformer 102. The embodiment of FIG. 2 depicts a two-transmit beam configuration, however the principles of the present invention can be applied to three or more transmit beams with different transmit focal points. The coherent echo signals of the two received beams are processed and combined by an FIR interpolation filter 110. The coherent echo signals of the first received beam are temporarily stored in a zone buffer 112. The coherent echo signals of the second received beam are processed by a fine delay 118. Since the two received beams have different transmit focal characteristics, the echoes of the two beams will not be exactly locationally aligned in the range (depth) dimension. The fine delay 118 imparts a small time delay or advance to echoes of the second beam so that the positions of the corresponding echoes along each beam will exhibit corresponding locational alignment. While no delay or a fixed delay has been found to be satisfactory for some applications, the preferred time delay is time varying with echo depth as discussed more fully below.

The locationally corresponding echoes of the first and second received beams are then amplitude weighted by two time varying weighting functions $W_1(t)$ and $W_2(t)$. Weighting coefficients of the two weighting functions are stored in coefficient memories 116 and 117 and are used to weight the echo signal samples by multipliers 114 and 115. Preferably the weighting functions are inversely related to the focal depths of the respective beams. The weighted echo samples are then coherently combined by a summing circuit 119 to form a coherent scanline with the extended focal properties of a synthetic transmit focused scanline. The scanline signals are bandpass filtered, detected and displayed in an ultrasound image.

Figure 3:
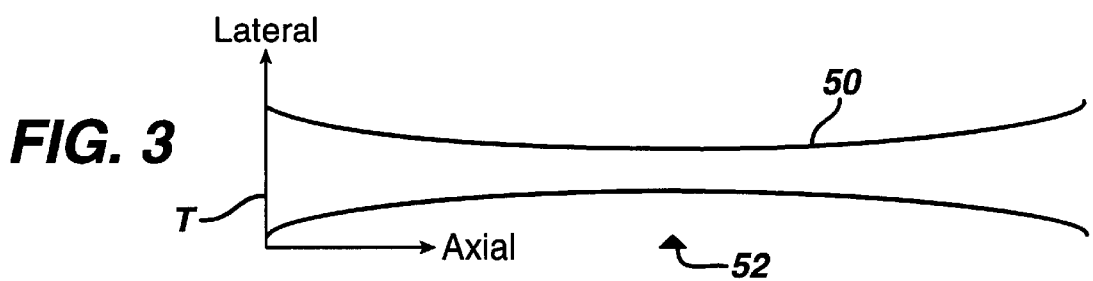
FIG. 3 illustrates a conventional ultrasonic beam characteristic with a single focal zone.
Figure 4:
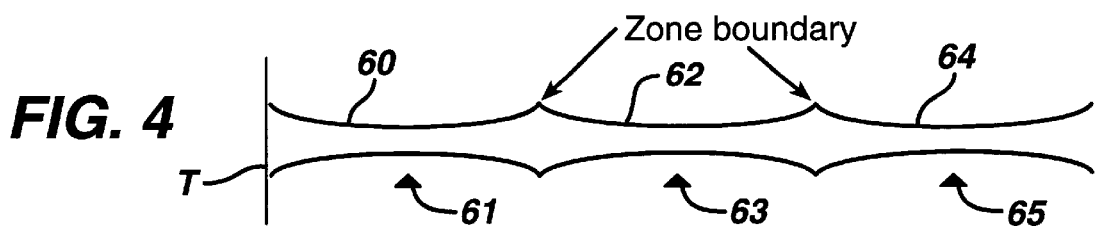
FIG. 4 illustrates a conventional multi-zone focus scanline.
Figure 5:
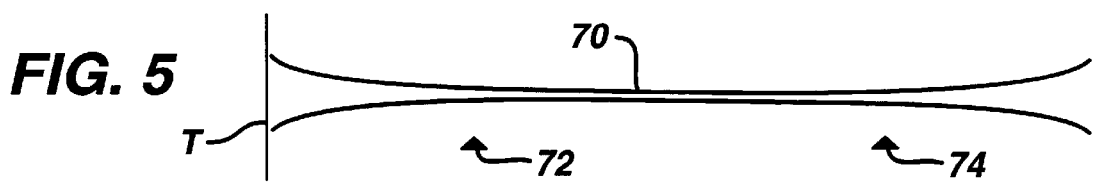
FIG. 5 illustrates the extended focal characteristic of a scanline processed in accordance with the principles of the present invention.

The operation and effect of an embodiment of the present invention can be appreciated by referring to FIGS. 3–5. FIG. 3 illustrates a focused beam pattern 50 transmitted by an array transducer located at position T in the drawing. The beam pattern is seen to narrow to a relatively narrow focus located about the focal point 52 at or near the geometric focal point as indicated by the small triangle. As is well known, the location of the focal point 52 is determined by the size and spacing of the elements of the active transmit aperture and the delays applied to the signals used to excite each transducer element of the active transmit aperture. A transmit beam 50 may be acceptable when the clinician is only interested in viewing a target located at or around the axial range of the focal point 52. The resultant image will exhibit its best focus in the vicinity of the focal point 52, and less optimal focus at depths which are increasingly shallower than or deeper than the focal point 52.

An image with improved focus can be produced by the multi-zone focusing arrangement of FIG. 1 which produces a result as illustrated in FIG. 4. In this example of multi-zone focusing, three transmit beams are used. The beam segment nearest to the array transducer T has a beam pattern 60 with a focal point 61, an intermediate range beam segment has a beam pattern 62 with a focal point 63, and the most distant range beam segment has a beam pattern 64 with a focal point 65. Each beam segment results from a separate transmit event, with the transmit focal characteristics (active transmit aperture, delays) optimized for each event for the specific transmit focal point and beam characteristic over a given short range which is less than the full range of the beam of FIG. 3.

Scanline segments received from each of the three transmit focal zones of FIG. 4 are spliced together to form a single scanline over the depth of field of the three segments. Several techniques are known for splicing the received segments together. U.S. Pat. No. 4,305,296, for example, assembles a full scanline by connecting the segments from the three zones end-to-end, referred to as the "butt-fit" approach. However, this approach can result in banding in the image where the image changes from one zone to another, due to gain or focal characteristic differences between the two zones or other zone-to-zone differences. The conventional approach to this problem is to acquire segments which overlap at the ends, indicated as the "zone boundary" in FIG. 3, so that the image can be faded from one zone to the next, known as the cross-fade approach. Cross-fading at the zone boundaries is shown in U.S. Pat. Nos. 5,568,813 and 5,579,770, for example.

An idealized beam characteristic resulting from practice of the present invention is shown in FIG. 5. This beam characteristic results from combining the echo signals of two scanlines, one having a shallow focal point 72 and the other having a deeper focal point 74. When the echo signals are processed and combined in accordance with the principles of the present invention an improved focal characteristic is produced over a substantial portion of the depth of the scanlines, as if a dynamic transmit focus were used. The focal characteristic improvement can be appreciated by comparing the beam characteristic of FIG. 5 with those of FIGS. 3 and 4.

Figure 6A:
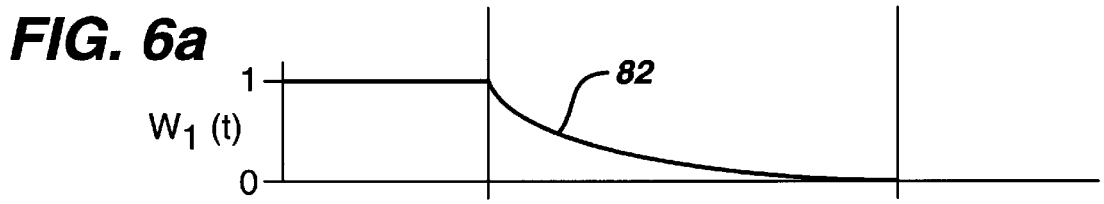
FIGS. 6a and 6b illustrate weighting characteristics used to combine two differently focused beams in accordance with the principles of the present invention.
Figure 6B:
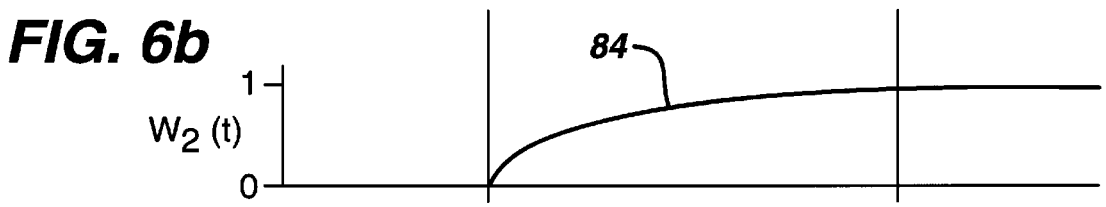

There are several aspects of the present invention which make possible such improvement. One is that the two scanlines are not simply butt-fit segments or segments cross-faded at the zone boundary as in the prior art. Instead, echoes over a substantial portion of the scanlines are processed and combined. Preferably echoes are combined over at least half of the distance (depth) from one focal point to the next. The characteristic shown in FIG. 5 results from the processing and combining of echo signals over the full distance from focal point 72 to focal point 74. Suitable weighting functions for use in processing the scanlines for the beam characteristic of FIG. 5 are shown in FIGS. 6a and 6b in spatial correspondence with FIG. 5. The first weighting function $W_1(t)$ for the shallow focused scanline is shown to have a normalized value of 1 from the transducer T to the focal point 72 of the shallow focused scanline. From the focal point 72 to the focal point 74 of the deeper focused scanline the $W_1(t)$ weighting function is seen to decline with an approximately inverse (1/range) function 82. While other functions including a linear response may be used between the focal points, the inverse (1/R) function is preferred as it more closely approximates the interpolation weights required to synthesize the transmit focus at intermediate points using an FIR interpolation filter of the type illustrated in FIG. 2. The $W_1(t)$ weighting function in this example is seen to decline to zero in the vicinity of the focal point 74 of the deeper focused beam.

In correspondence with the change of the $W_1(t)$ weighting function, the $W_2(t)$ weighting function for the more deeply focused scanline has a zero value up to the focal point 72 of the shallower focused beam. Thereafter the weighting function increases with a (1—inverse) function 84 until attaining a normalized value of 1 at the focal point 74 of the more deeply focused beam. Thus, when the echoes from a shallow focused beam and a deeper focused beam are weighted with these functions and combined, the multizone focused beam is a function of only the shallow focused beam in the very near field (depths shallower than focal point 72), a function of only the more deeply focused beam in the most far field (beyond focal point 74), and a function of the two beams between the focal points of the beams, in relation to the relative focal quality of the two beams over these intermediate depths of field. Exemplary weighting functions for combining two scanlines focused at $R_1$ and $R_2$ are of the form $\omega(R_1)=1-\alpha$ and $\omega(R_2)=\alpha$, where $$\alpha = C_1 - C_2\left(\frac{1}{R}\right) = \left(\frac{1}{R_1} - \frac{1}{R}\right)\left(\frac{R_1 R_2}{R_2 - R_1}\right) = \left(\frac{R - R_1}{R}\right)\left(\frac{R_2}{R_2 - R_1}\right)$$

for regions where the paraxial approximation holds and the transmit apertures are of equal extent. When the transmit apertures do not have equal extent the weights may be chosen by an algorithm that optimizes some aspect of the synthesized transmit beam quality. It has been found that maximizing the mainlobe to sidelobe ratio with depth provides satisfactory results.

Figure 7:
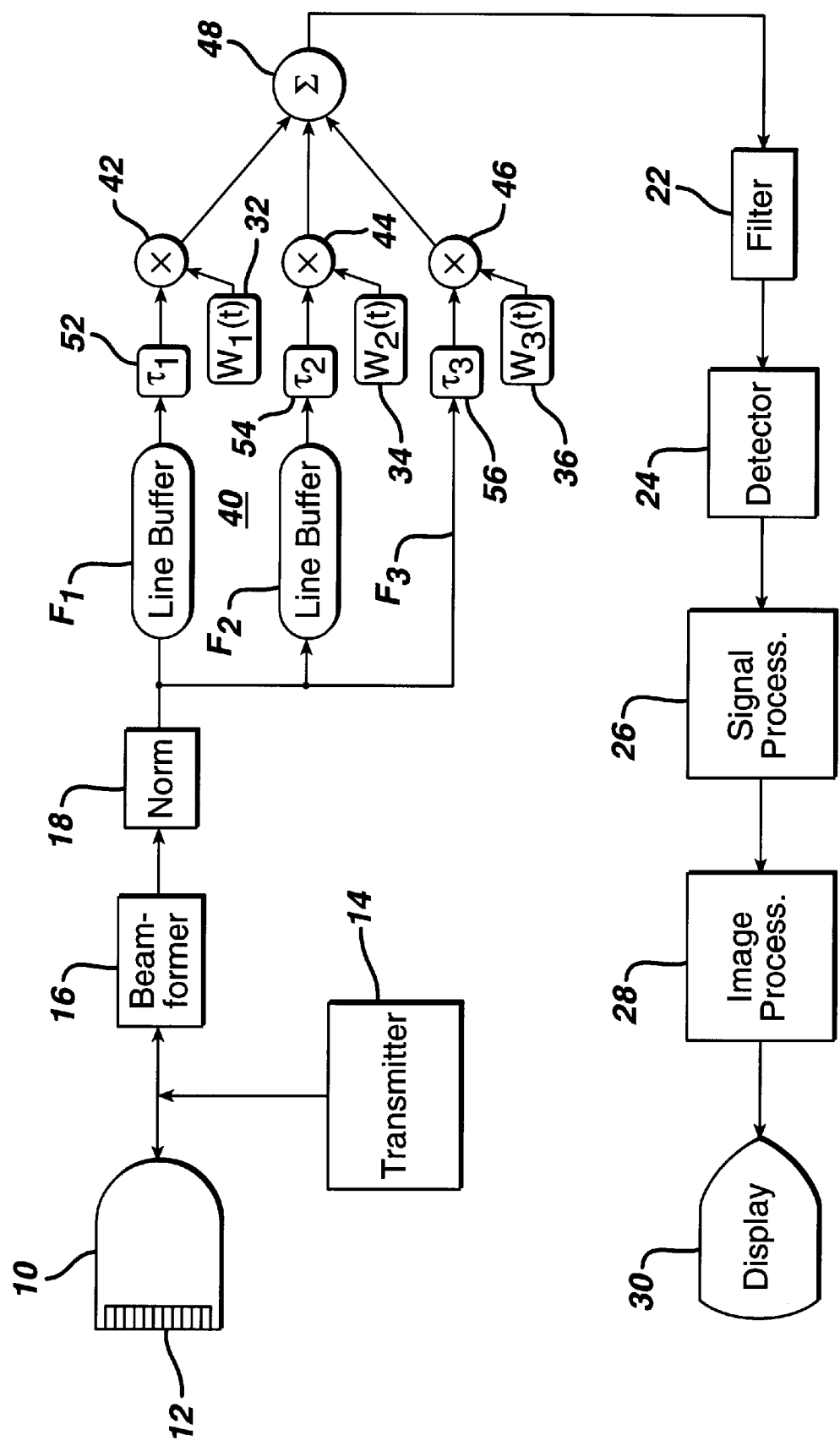
FIG. 7 illustrates in block diagram form a second embodiment of an ultrasonic diagnostic imaging system constructed in accordance with the principles of the present invention.

Referring to FIG. 7, a second embodiment of an ultrasonic diagnostic imaging system constructed in accordance with the principles of the present invention is shown. An array transducer 12 of a probe 10 is controlled by a transmitter 14 to transmit ultrasonic beams with different transmit focal characteristics into a body. The tranmitter also steers the beams in desired beam directions. Echoes from within the body are produced in response to each transmitted beam and are received by the elements of the array transducer 12. The echoes are coupled to a beamformer 16 where they are appropriately delayed and combined to form coherent echo signals along each received scanline. In a conventional ultrasound system these scanline echo signals are filtered by a filter 22, detected by a detector 24 or Doppler processed by signal processor 26, then arranged into an image format by an image processor 28. The image signals are then displayed on a display 30.

In accordance with the principles of the present invention, an r.f. blending circuit 40 coherently blends the echo signals of a plurality of scanlines which exhibit different transmit focal depths. The r.f. blending circuit 40 can be implemented in the form of a digital filter, and is shown in the form of an FIR filter which, in the embodiment of FIG. 7, can resample, interpolate, and blend up to three scanlines at a time. In a typical operating scenario, a scanline location is scanned a number of times, each time with a different transmit focal point or range. The coherent echo signals produced by the beamformer 16 undergo normalization in a normalization circuit 18 to normalize the effects of different transmit apertures and transmit intensities for the different beams. The echo signals produced in response to the first and second differently focused transmit waves are stored in line buffers $F_1$ and $F_2$. The line buffers can comprise FIFO memories, for example. The echo signals from the third and (in this embodiment) last scan of the scanline location are coupled along path $F_3$. The scanline echo signals previously stored in line buffers $F_1$ and $F_2$ are now shifted out in synchronism with the echo signals of the last scanline and coherently combined. A third line buffer can be used in path $F_3$ if it is desired to temporarily store the last scanline prior to processing and combining with the echo signals of the other scanlines.

Prior to being combined the echo signals of the respective beams are locationally aligned by time variable delays 52, 54 and 56 and appropriately weighted by weighting circuits comprising multipliers 42, 44, and 46, to which time variable weighting functions $W_1(t)$, $W_2(t)$ and $W_3(t)$ are applied from coefficient stores 32, 34 and 36. The delayed and weighted r.f. echo signals from the multiple scans of the scanline are coherently combined by a summing circuit 48 to produce a composite scanline which synthesizes the effect of a dynamic transmit focus. The effect of the weighting circuits is to weight the relative contributions of the echo signals from the three beams to the composite scanline. Preferably this weighting is functionally related to the transmit aperture and the distances of each echo signal from its respective transmit focal point and the other focal points used in the combination process. The effect of the delays is to locationally align the r.f. echo signals being combined so that possible phase cancellation resulting from the combination of locationally mismatched signal data is reduced and preferably minimized. Preferably the delay characteristic is functionally related to the transducer transmit aperture and the distance of the echo signal from its transmit focal point. The result of this combining process is to produce a scanline with an extended range of focus.

The time delays 52–56 can be implemented in a variety of ways in consideration of the beamforming architecture used. In a preferred embodiment a time delay beamformer 16 is employed in which coherent beams are formed by time delaying and combining the signals received from the individual transducer element. With a time delay beamformer the time delays 52–56 can be implemented by a resampling filter or an interpolation filter which produces echo samples at the desired range locations. When a phase shift beamformer is used such as that described in U.S. Pat. No. 5,623,928 a phase aligner or phase rotator can be used to impart a phase adjustment to the beam samples with a complex multiplier as described in that patent. In either case the time delays or phase adjustment can be implemented at any point in the processing sequence prior to the summing circuit 48. Specifically, the delays or phase adjustments can be implemented on a per-channel basis in the beamformer 16. Likewise, the weighting function of the present invention can also be employed at any point prior to the summing circuit 48, including integration of the weighting coefficients with those of other filter functions.

A second aspect of the present invention which makes possible the foregoing improvement is that, unlike prior art techniques, the differently focused beams are being coherently combined rather than incoherently combined, i.e., combined before being nonlinearly processed, with care taken to synchronize the timing (clocks) of the transmit and receive circuitry. The arrangements shown in the prior art multi-zone patents show the cross-fading at the zone boundaries being performed on detected echo data, not r.f. echo data. The embodiment of FIG. 7 shows the r.f. blending circuit 40 located prior to the detector 24. The circuit 40 can accordingly be located at any point in the signal path where the signals being combined remain coherent. The circuit could be located either before or after baseband demodulation, for instance.

Figure 8A:
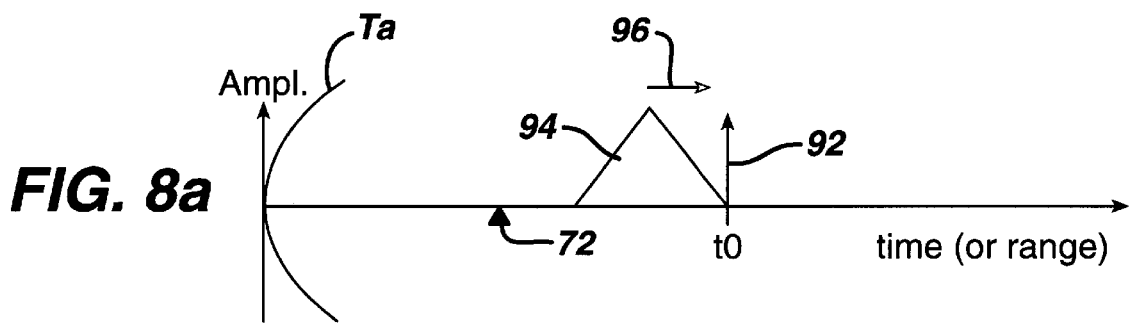

FIGS. 8a–9b illustrate the locational misregistration occurring at locations removed from a beam focal point. FIG. 8a shows a transducer aperture with an effective curvature focused at a focal point 72 along the abscissa of the drawing, which represents the time of travel or range (depth) from the transducer. The transmitted wave will exhibit an optimal impulse response at the focal point 72 where the beam is optimally focused. On either side of the focal point the impulse response will be locationally offset or displaced and less optimal (spread out). This is illustrated at point t0 where an optimal impulse response (represented by the arrow 92) is desired but the actual impulse response is locationally advanced and broadened as shown by the triangular response 94 due to the fact that the transmit aperture is out of focus (not optimally focused) at point t0. In order to compensate for this out-of-focus condition, the echoes returned from point t0 are delayed as indicated by arrow 96 to provide a locational adjustment of the received echo signals. The phase shift or time delay applied at points along the abscissa preferably corresponds to the degree of defocus, which is a function of the time or distance from the optimal focal point 72, as indicated by the delay compensation characteristic 98 in FIG. 8b. As the characteristic 98 shows, a compensating delay is used for points distal to (beyond) the transmit focal point 72.

Full compensation for the broadening would require the use of an inverse (preferably a Wiener) deconvolution filter rather than a delay. The intent of a delay or phase correction is to minimize the locational error or phase error at the center frequency of the transducer probe or signal.

Figure 8B:
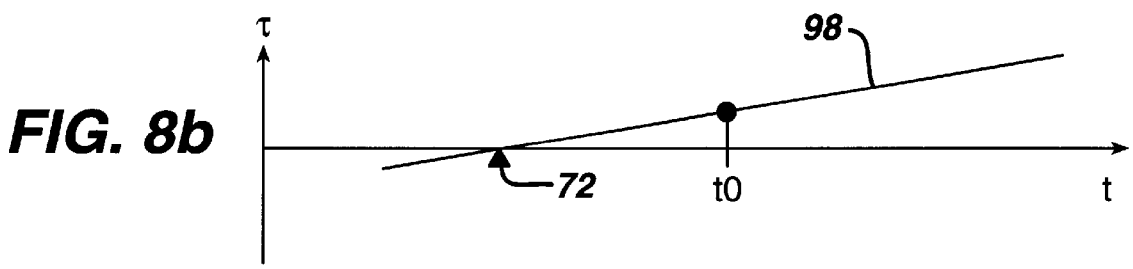
Figure 9A:
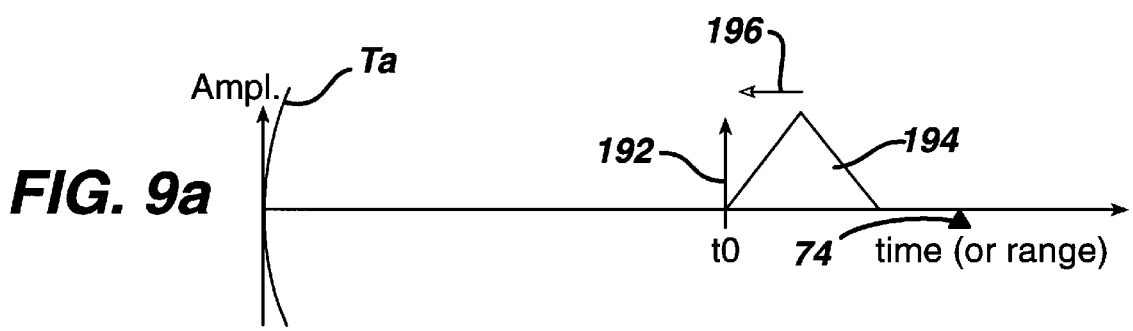

FIG. 9a shows the condition arising when the transducer aperture is focused at a more distant transmit focal point 74 and point t0 is proximal to (nearer to the aperture than) the focal point. In this case an advance or negative delay or phase alignment of opposite sense to that of FIGS. 8a and 8b, indicated by time advance arrow 196, is used to compensate for the delayed and broadened impulse response 194. It will be appreciated that "advance" is a relative term, and can be obtained by one signal being delayed to a lesser extent than another. Delay compensation characteristic 198 in FIG. 9b is seen to be below the abscissa in the drawing, showing that a time delay or phase alignment of opposite sense to that of FIG. 8b is required for echo signals at point t0 when the point t0 is proximal to the transmit focal point.

The illustration of the delays and impulse response spreading of FIGS. 8a–9b are exaggerated for purposes of illustration. In practice it has been found that these delays are usually quite small, often on the order of less than a period of the echo signal center frequency. Excessive delays would be indicative of spatial undersampling of the transmit foci for purposes of combining.

Figure 9B:
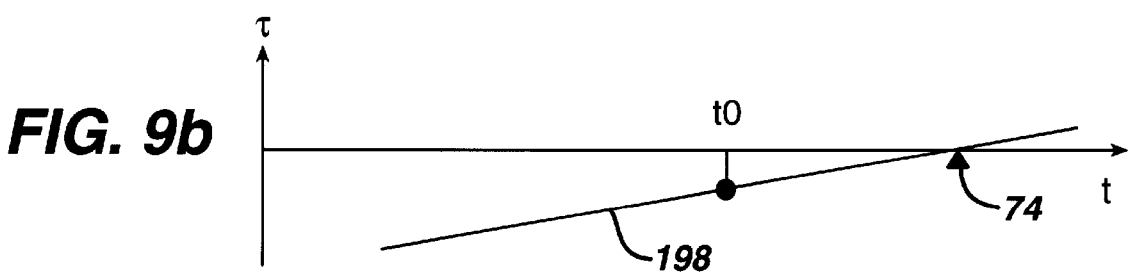

FIGS. 8b and 9b illustrate the use of linear delay or phase compensation characteristics for the echo signals from the differently focused scanlines which are to be combined to form an extended focus scanline. While linearly varying compensation is suitable for implementation of the present invention, a preferred delay characteristic is the nonlinear characteristic 140 shown in FIG. 10. This delay characteristic is produced by the expression $$\Delta = \Delta_f - (\sqrt{R^2 + a^2} - R)$$

where $\Delta$ is the value of the delay compensation at range R, a is the effective off-axis dimension of the transmit aperture, and the delay at the transmit focal point $\Delta_f$ is $$\Delta_f = \sqrt{R_f^2 + a^2} - R_f$$

where $R_f$ is the range at which the transmit aperture is focused. The term a is the effective aperture in the sense that it provides the group delay resulting from the aggregate contributions to the delay of all elements in the transmit aperture.

An embodiment of the present invention can be employed which does not utilize time delay or phase compensation. Alternatively, fixed delays can be used, in which case there is a progressive axial spatial distortion between focal points which may be compensated for during scan conversion, if desired. Preferably, dynamic delay compensation is used. The use of delay compensation has been found to improve axial resolution and to increase on-axis response while reducing undesired cancellation resulting from the combining of locationally misaligned signals of the scanlines being combined. The improved on-axis response also results in lateral resolution improvement. Even a fixed delay (as opposed to the preferred dynamic delay) can provide improvement at points along the combined echo scanline.

It will be appreciated that the relative delays described by FIGS. 8a–10 are illustrated by delays $\tau_1$–$\tau_3$ in the embodiment of FIG. 7. The relative delays can be implemented in a variety of ways. When FIFO registers are used for the line buffers the delays can be implemented by the relative timing of the clock signals for the registers. If a memory device or devices are used for the line buffers the delays can be implemented by the timing of memory data access. In a particular embodiment these techniques for delay implementation may result in a time delay adjustment which. is more coarse than desired. Time varying (dynamic) delays with resolution finer than a sample period of the beamformer output are realized by using an FIR interpolation filter with time varying coefficients. Such a filter has been found to work well if the delay change is updated frequently, on the order of 1/32 of a wavelength or better.

The delays are implemented in the embodiment of FIG. 7 as group delays applied to beamformed signals. It will be appreciated that if a programmable beamformer is used, the delays can also be implemented in the beamformer. Since the beamformer channels utilize delays for beam formation, the delays of the present invention can be implemented in the beamformer as adjustments to beamformer delay or phase shift values.

It should be noted that in the prior art, the butt-fitting of adjacent scanline segments is done with no combining of signals of the adjoining segments, and the cross-fading techniques shown in the cited patents only cross-fade two adjoining scanline segments at the zone boundaries where the segments overlap. A preferred embodiment of the present invention, as discussed above, combines scanline segments which spatially overlap for an appreciable range, generally at least half the distance between focal points and preferably for the full distance between focal points as illustrated in FIGS. 5, 6a and 6b. Furthermore, when more than two transmit beams are used, more than two overlapping beams can be combined at specific depths of field. The embodiment of FIG. 7, for example, is an embodiment for combining three overlapping, differently focused scanlines. Each received scanline can extend for the full depth of the final extended focus scanline, and at different points along the scanline signals from one, two or even three beams are combined with weighting and/or phase adjustment to form the composite extended focus scanline. The number of individual beams which are combined at any point along the extended focus scanline is a function of the relative contributions from the received echo signals at each point along the scanline, and can be implemented by choice of desired weighting functions. A weighting function which uses negative weights for some of the signals at times can be used, and may be particularly useful when more than two scanlines are being combined at a time. For instance, only the focused beam can be used at the individual focal points, with contributions from other beams being added (or subtracted) on either side of the focal points. Alternatively, multiple beams can contribute to the extended focus scanline at one or more of the individual focal points in addition to locations between focal points. The resulting effect is as if the extended focus scanline were transmitted with a dynamic transmit focus. The r.f. extended focus scanline is then detected or further processed for display.

FIG. 11 illustrates an embodiment of the present invention where high frame rates of display can be obtained through the principles of multiline reception and both beam steering and beam focus interpolation. This drawing spatially depicts scanline locations in an ultrasonic image field. A first beam $T_{S1}$ is transmitted as shown with a relatively short (near to the transducer) focus. Two scanlines $R_{S1}$ and $R_{S2}$ are received on either side of the transmit beam center, each with a relatively short transmit focal point $f_S$. A second beam $T_{L1}$ is transmitted as shown with a relatively long (farther from the transducer) focus, and two scanlines $R_{L1}$ and $R_{L2}$, each with a relatively deeper focal point $f_L$ are received on either side of the center of the second beam $T_{L1}$. Transmission and reception continues in this manner, with a third transmit beam $T_{S2}$ resulting in multilines $R_{S3}$ and $R_{S4}$ and a fourth transmit beam $T_{L2}$ resulting in multilines $R_{L3}$ and $R_{L4}$ (not shown). As the second row of FIG. 11 shows the result is a laterally interleaved sequence of scanlines of different focal points.

From this sequence of differently steered and focused scanlines, image scanlines with multiple or extended focal ranges are produced, as shown at the bottom of FIG. 11. An image scanline $SL_1$ at a laterally intermediate position with properties of both focal points $f_S$ and $f_L$ is formed by weighting (and, if desired, time delaying or phase shifting) and coherently combining laterally distinct scanlines $R_{S1}$ and $R_{L1}$. Similarly, a laterally intermediate image scanline $SL_2$ with properties of both focal points $f_S$ and $f_L$ is formed by weighting (and, if desired, time delaying or phase shifting) and coherently combining laterally distinct scanlines $R_{L1}$ and $R_{S2}$. Image scanlines $SL_3$–$SL_6$ are formed in a similar manner. In a preferred embodiment the weighting functions used are inversely related to the focal characteristics of the transmit beams such as those shown in FIGS. 6a and 6b. While linearly varying weighting functions can be employed, in a preferred embodiment the weighting functions are nonlinear as described above, and time varying. Time varying delay functions similar to those described above can also be employed, and can also be linearly or nonlinearly varying with time. Image scanlines with multiple or extended focal characteristics are thus synthesized across the image field at intermediate scanline positions, then Doppler or amplitude detected and displayed. Alternatively the received beams from differently focused transmit beams can be steered to be in lateral alignment, with extended focus scanlines produced at the common location at which the differently focused beams are aligned. It is seen that the image frame rate will be relatively high due to the use of multiline reception, in which multiple scanlines are received in response to a single transmit beam. The acquisition strategy illustrated in FIG. 11 results in two extended focus lines being synthesized for every transmit event. This is a four times improvement relative to an arrangement without multiline acquisition which requires two transmit beams to synthesize one extended focus line. Alternatively, high frame rate can be traded off for higher scanline density. Furthermore, since the image scanlines are consistently synthesized from scanline data received from different transmit beams, interpolation artifacts are reduced. It will be appreciated that this technique works with multiline reception greater than the 2:1 ratio shown in this example, and that lateral interpolation can be done with a filter operating on more than two received scanlines at a time. Further details of extended focusing with multiline reception, including different beam steering techniques and the correction of misregistration artifacts, are found in concurrently filed U.S. patent application Ser. No. [ATL-209], entitled ULTRASONIC DIAGNOSTIC IMAGING SYSTEM WITH HIGH FRAME RATE SYNTHETIC TRANSMIT FOCUS by the present inventors, the contents of which is incorporated herein by reference. Other configurations, where beam steering and beam focus interpolation are combined without multiline operation are also within the scope of the present invention.

A further advantage of the present invention is an ease of what is known as scanhead integration. In scanhead integration a transducer probe is matched to operate with an ultrasound system. Optimal imaging performance is obtained by utilizing beamforming and signal processing which is best matched to the performance of the transducer array. One performance characteristic which requires careful attention is the uniformity of a multi-zone image. Because the separate scanline segments of a multizone image are often acquired with different gain and or aperture control, the multi-zone image can appear to have seams where the individual segments are joined together. An embodiment of the present invention which combines beam segments over a substantial distance between focal points or combines more than two beams will markedly reduce the seam problem, thereby reducing the need for special adjustment at the zone boundary locations. Gain adjustments are only required to broadly equalize the gains of the various zones, which is a much simpler task.

What is claimed is:

1. A method for producing an ultrasonic scanline comprising the steps of:

transmitting a first transmit beam having a first transmit characteristic;

receiving a first sequence of echoes in response to said first transmit beam;

transmitting a second transmit beam having a second transmit characteristic;

receiving a second sequence of echoes in response to said second transmit beam; and coherently combining echoes of said first and second sequences to form a scanline having characteristics of both of said first and second transmit beams.

2. The method of claim 1, wherein said first transmit characteristic is a first transmit focus and wherein said second transmit characteristic is a second transmit focus.

3. The method of claim 2, wherein said first transmit focus is at a greater depth than said second transmit focus.

4. The method of claim 1 or 3, wherein said first and second transmit beams are spatially aligned.

5. The method of claim 1 or 3, wherein said first and second transmit beams are not spatially aligned.

6. The method of claim 1 or 3, further comprising the step of relatively weighting echoes of said first and second sequences before the step of coherently combining.

7. The method of claim 6, wherein said step of relatively weight ing comprises the step of relatively weight ing echoes of said first and second sequences with weighting functions which vary with time or distance before the step of coherently combining.

8. The method of claim 1 or 3, further comprising the step of relatively time delaying echoes of said first and second sequences before the step of coherently combining.

9. The method of claim 8, wherein said step of relatively time delaying comprises the step of relatively time delaying echoes of said first and second sequences with time delay functions which vary with time or distance before the step of coherently combining.

10. The method of claim 8, wherein said steps of receiving comprise beamforming received echo signals with a time delay beamformer.

11. The method of claim 1 or 3, further comprising the step of relatively phase aligning echoes of said first and second sequences before the step of coherently combining.

12. The method of claim 11, wherein said step of relatively phase aligning comprises the step of relatively phase aligning echoes of said first and second sequences with phase correction functions which vary with time or distance before the step of coherently combining.

13. The method of claim 11, wherein said steps of receiving comprise beamforming received echo signals with a phase shift beamformer.

14. An ultrasonic diagnostic imaging system comprising:
   an array transducer which transmits and receives beams of different transmit characteristics;
   a beamformer coupled to said array transducer which produces first and second sequences of echo signals in response to the transmission of beams of different transmit characteristics; and
   a combining circuit, coupled to said beamformer, which coherently combines echo signals of beams of different transmit characteristics,
   whereby scanlines having the properties of different transmit beam characteristics are provided.

15. The ultrasonic diagnostic imaging system of claim 14, further comprising a transmitter, coupled to said array transducer, which controls said array transducer to transmit beams of different transmit foci,
   whereby scanlines having the properties of different transmit focus characteristics are provided.

16. The ultrasonic diagnostic imaging system of claim 14 or 15, wherein said transmit beams of different transmit characteristics are spatially aligned.

17. The ultrasonic diagnostic imaging system of claim 14 or 15, wherein said transmit beams of different transmit characteristics are not spatially aligned.

18. The ultrasonic diagnostic imaging system of claim 14 or 15, further comprising a weighting circuit responsive to said echo signals which relatively weights echoes of said first and second sequences prior to being coherently combined.

19. The ultrasonic diagnostic imaging system of claim 18, wherein said weighting circuit comprises a time varying weighting circuit.

20. The ultrasonic diagnostic imaging system of claim 14 or 15, further comprising a delay circuit responsive to said echo signals which relatively delays echoes of said first and second sequences prior to being coherently combined.

21. The ultrasonic diagnostic imaging system of claim 20, wherein said delay circuit comprises a time varying delay circuit.

22. The ultrasonic diagnostic imaging system of claim 20, wherein said beamformer comprises a time delay beamformer.

23. The ultrasonic diagnostic imaging system of claim 14 or 15, further comprising a phase aligner responsive to said echo signals which relatively phase shifts echoes of said first and second sequences prior to being coherently combined.

24. The ultrasonic diagnostic imaging system of claim 23, wherein said phase aligner comprises a time varying phase aligner.

25. The ultrasonic diagnostic imaging system of claim 23, wherein said beamformer comprises a phase shift beamformer.

26. The ultrasonic diagnostic imaging system of claim 14 or 15, further comprising:
   a weighting circuit responsive to said echo signals which relatively weights echoes of said first and second sequences prior to being coherently combined; and
   at least one of a) a time delay circuit and b) a phase aligner responsive to said echo signals for relatively delaying or phase shifting echoes of said first and second sequences prior to being coherently combined.

27. The ultrasonic diagnostic imaging system of claim 26, further comprising a normalization circuit having an input coupled to said beamformer and an output coupled to said combining circuit.

28. The ultrasonic diagnostic imaging system of claim 26, further comprising a detector having an input coupled to receive signals from said combining circuit and an output; and
   a display having an input coupled to the output of said detector.

29. A method for producing an ultrasonic scanline comprising the steps of:
   transmitting and receiving a first beam having a first focus characteristic;
   transmitting and receiving a second beam having a second focus characteristic; and
   coherently combining the focus characteristics of said first and second beams.

30. The method of claim 29, further comprising the step of weighting at least one of said first and second received beams as a function of depth prior to the step of coherently combining.

31. The method of claim 30, wherein one of said focus characteristics is a relatively near field focus and the other of said focus characteristics is a relatively far field focus.

32. The method of claim 31, further comprising the step of detecting the signals of said coherently combined beams.

* * * * *